Jan. 27, 1970 V. V. WEYANT 3,491,642
ROTARY SIDE TRIMMER FOR HEAVY GAUGE MATERIAL
Filed April 19, 1967 4 Sheets-Sheet 1

INVENTOR.
VALONE V. WEYANT
BY
Meyer, Tilberry & Body
ATTORNEYS.

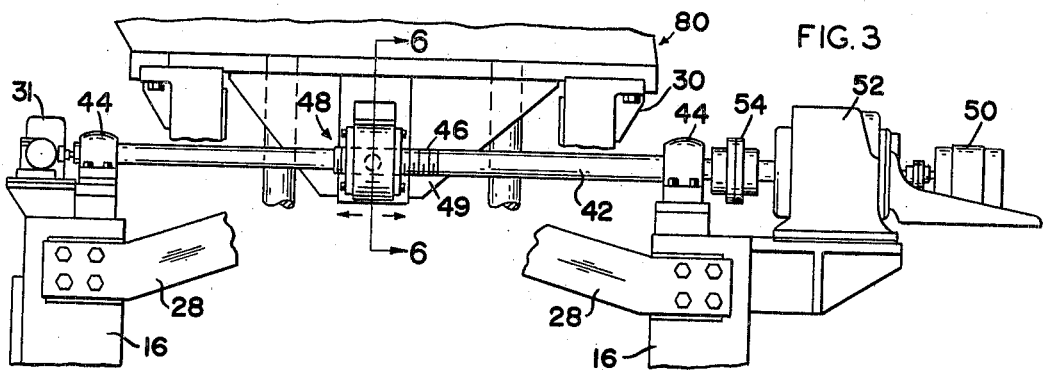
FIG. 3
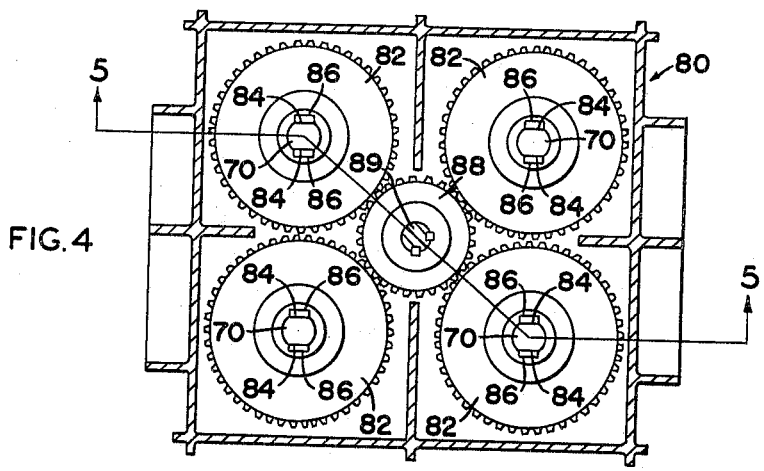
FIG. 4
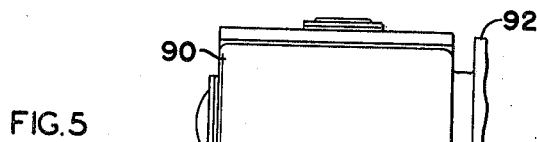
FIG. 5
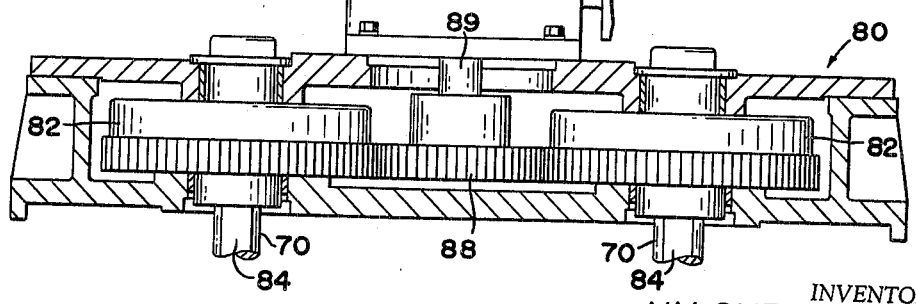
INVENTOR.
VALONE V. WEYANT
BY
Meyer, Tilberry & Body
ATTORNEYS.

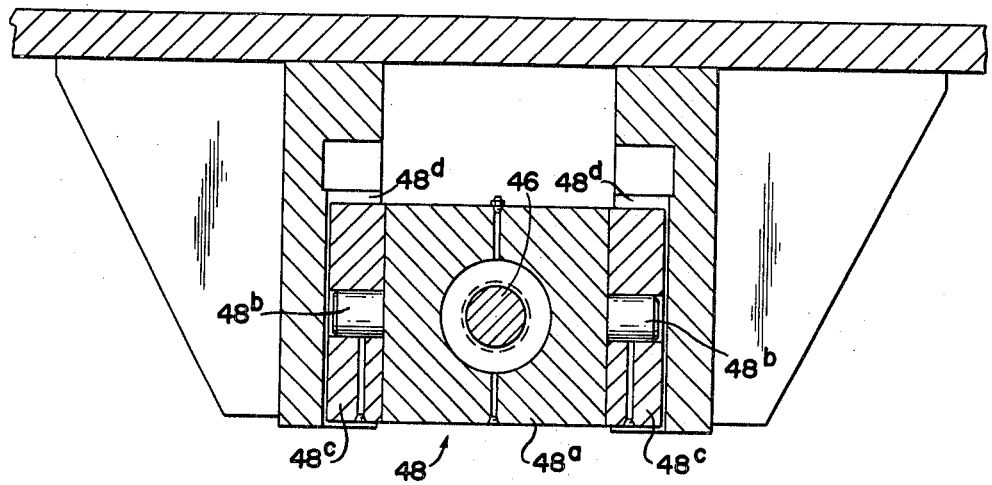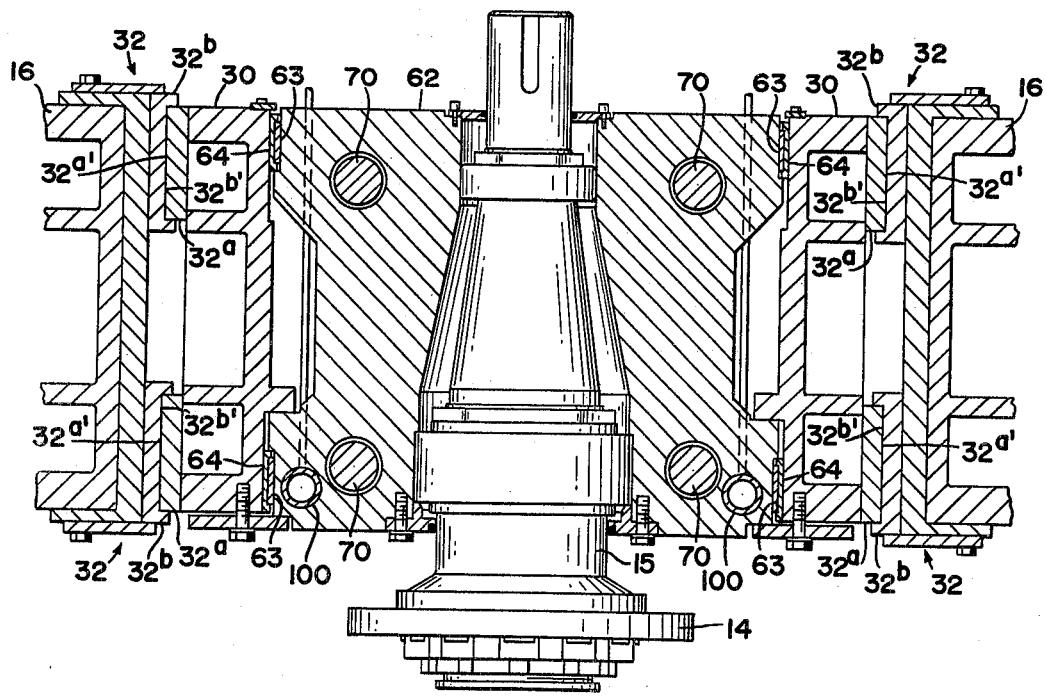

United States Patent Office 3,491,642
Patented Jan. 27, 1970

3,491,642
ROTARY SIDE TRIMMER FOR HEAVY GAUGE MATERIAL
Valone V. Weyant, Hanoverton, Ohio, assignor to E. W. Bliss Company, Canton, a corporation of Delaware
Filed Apr. 19, 1967, Ser. No. 631,955
Int. Cl. B26d 1/24; B23d 19/04
U.S. Cl. 83—503          22 Claims

ABSTRACT OF THE DISCLOSURE

A side trimmer including a pair of cooperating upper and lower cutting discs mounted in a first frame for adjustment toward and away from one another to permit variation of the degree of disc overlap or spacing. Additionally, in order to permit the upper disc to be positioned on the entry or delivery side of the lower disc, the first frame is mounted in a second frame for oscillatory adjustment about a line generally coextensive with the axis of the lower cutting disc.

---

This invention is directed toward the cutting art, and more particularly to an improved rotary type cutting machine.

The invention is especially applicable for use in a cutting machine of the type utilized for edge trimming heavy gauge metal plates and sheets, and will be described with particular reference thereto; however, it is appreciated the invention is capable of broader application and could be used in a variety of types and sizes of cutting machines.

Cutting machines of the type utilized in edge trimming sheet material generally employ a pair of rotatably driven circular cutting discs arranged so that their outer peripheries are closely spaced or slightly overlapped to produce a shearing action on the material as it is fed between the discs. In those machines which are utilized for shearing metal stock of varying types and thicknesses, it is highly desirable that provision be made for adjusting the distance between the center of the discs to permit the degree of disc overlap or vertical clearance to be varied to suit the requirements dictated by the stock material thickness and hardness. For the same reason, it is highly desirable that the angle between the line joining the center of the discs and the direction of work feed (commonly referred to as the work entry angle) be adjustable. Additionally, it is usually necessary that the machine be adjustable in a direction parallel to the cutting disc axes so that the plane of cut can be adjusted to allow variation in width of material sheared.

Because of the large forces acting on the machine during the cutting operation, difficulties are encountered in attempting to provide apparatus which will permit all the desired adjustments while retaining the necessary degree of rigidity. For this reason, previous machines, especially those of the larger sizes, often did not provide for all individual desirable adjustments. Rather, the machines were designed with only a limited number of adjustments, and otherwise fixed at mean positions which were deemed to be generally satisfactory for the majority of the work the machine was expected to perform.

One highly desirable adjustment which was normally not provided was provision for varying the work entry angle. Those machines on which such adjustment was provided utilized complicated parallel link machanisms. In addition to being costly, these mechanisms were generally difficult to adjust since when the work entry angle was adjusted the spacing between the blades simultaneously changed, necessitating readjustment thereof. Further, these mechanisms made it difficult to provide for the other individual desirable adjustments.

The present invention overcomes the above problems and provides an improved cutting machine wherein any or all the desirable individual adjustments can be made simply and without affecting the settings of any of the other adjustments.

In accordance with one aspect of the present invention, a cutting machine having a first frame carrying a pair of upper and lower cooperating cutting discs mounted for rotation about spaced horizontal axes is provided with the improvement comprising second frame means for mounting the first frame for selective oscillation about a line generally coextensive with one of the axes. In this manner, the work entry angle can be varied from entry to delivery side without changing the spacing between the cutting discs.

In accordance with a more limited aspect of the present invention, the cutting machine is also provided with additional means for varying the spacing between the cutting discs.

In accordance with another aspect of the present invention, a cutting machine having a frame carrying a pair of upper and lower cooperating cutting discs mounted for rotation on spaced upper and lower horizontal axes is provided with the improvement comprising first means for varying the position of at least one of the axes while maintaining the spacing between said axes constant, and second means for varying the spacing between said axes.

A primary object of the present invention is the provision of a rotary disc type cutting machine having a variety of independent cutting disc adjustments which can be made simply and without affecting the settings of any of the other adjustments.

An additional object of the present invention is the provision of a cutting machine of the general type described which is simply constructed but capable of being readily adjusted to position the blades in the most suitable relationship as determined by the material to be cut.

A further object of the present invention is the provision of a shearing machine having cooperating cutting discs capable of being adjusted to the most desirable relationship for shearing a variety of types and thicknesses of material.

These and other objects and advantages will become apparent from the following description used to illustrate a preferred embodiment of the invention when read in connection with the accompanying drawings wherein.

Figure 2:
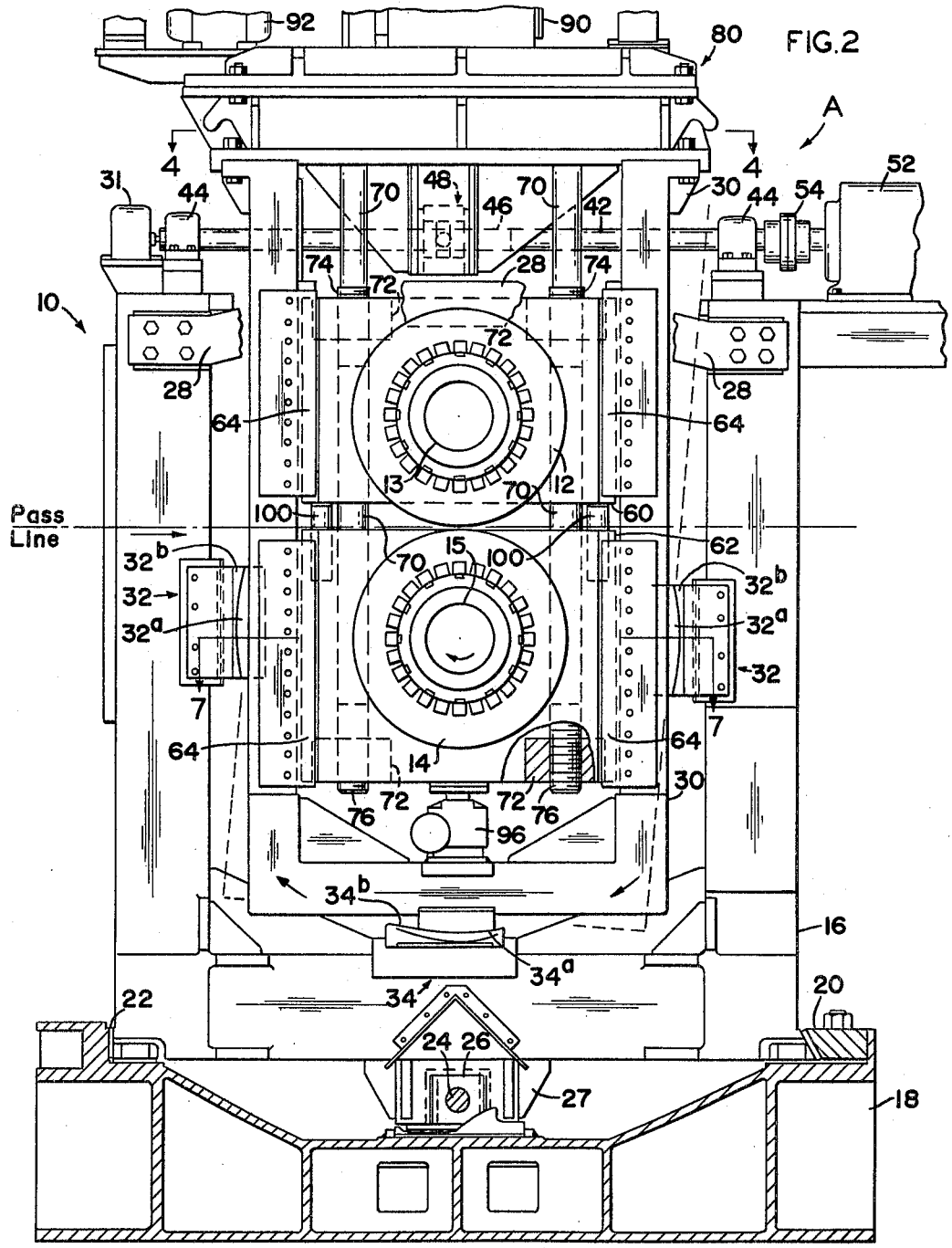
FIGURE 2 is an elevational view looking toward the cutting disc side of the machine of FIGURE 1.

FIGUAE 3 is an enlarged view of the drive mechanism utilized to position the axis of the upper cutting blade on the delivery side of the axis of the lower cutting blade;

FIGURE 4 is a cross-sectional view taken on line 4—4 of FIGURE 2;

FIGURE 5 is a cross-sectional view taken on line 5—5 of FIGURE 4;

FIGURE 6 is a cross-sectional view taken on line 6—6 of FIGURE 3; and

FIGURE 7 is a cross-sectional view taken on line 7—7 of FIGURE 2.

Figure 1:
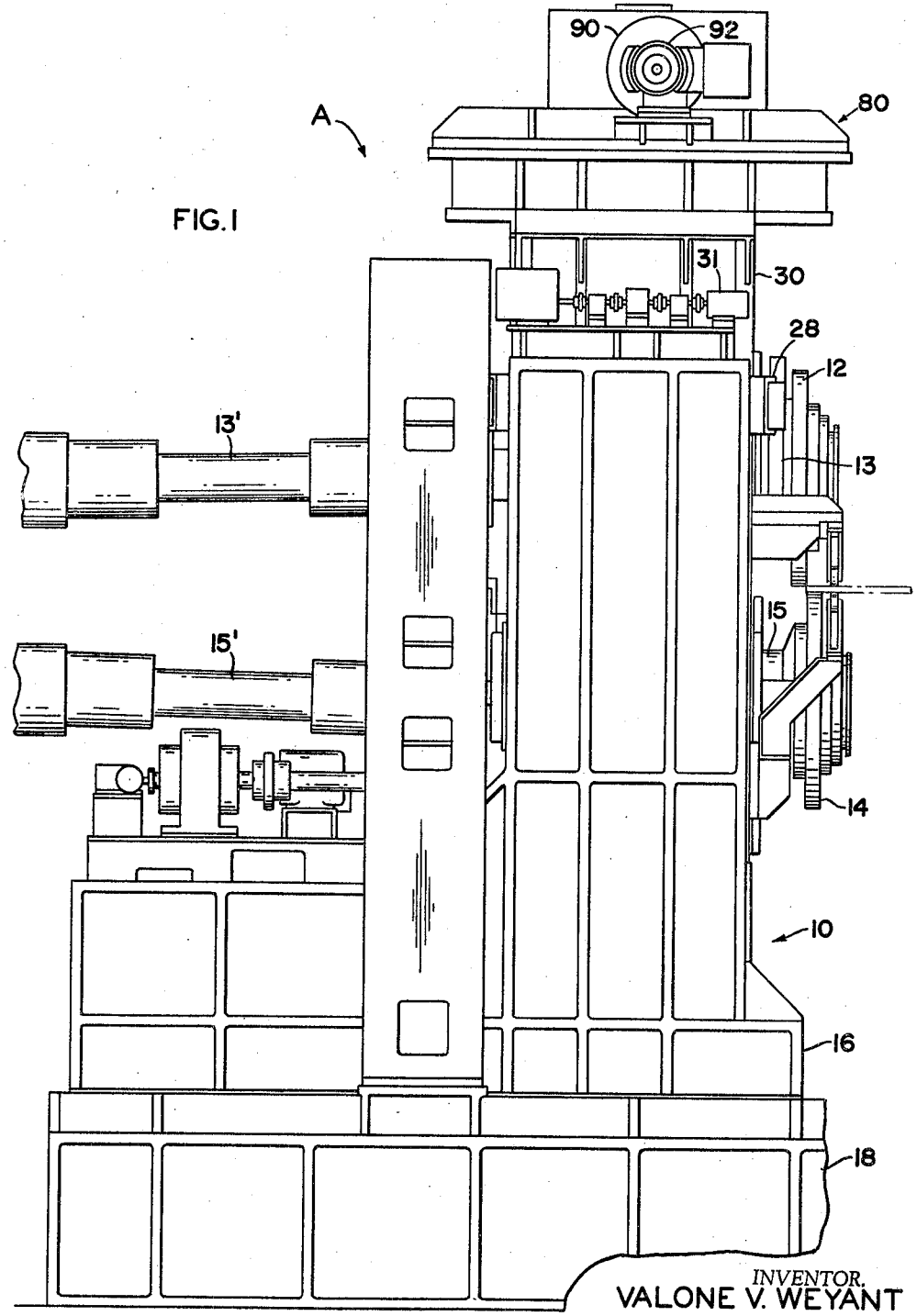
FIGURE 1 is a side elevation of a trimming machine formed in accordance with the present invention.

Referring now to the drawings wherein the showings are for the purpose of illustrating a preferred embodiment of the present invention only and not for the purpose of limiting same, FIGURES 1 and 2 show the overall arrangement of trimming or shearing machine A comprised of a frame assembly 10 carrying a pair of shearing blades 12 and 14 carried on the ends of horizontally positioned arbors 13 and 15, respectively. Preferably, the cutting discs are releasably connected to the arbors by a connector arrangement as shown in my copending U.S. patent application Ser. No. 619,396, filed Feb. 28, 1967. The arbors 13 and 15 are driven in a conventional manner from drive shafts 13' and 15' respectively, which are connected to a motor and reducer unit not shown.

Normally two such machines A would be positioned in face-to-face relationship, such as in the manner shown in U.S. Patent No. 3,080,783. The use of two such machines positioned as described and shown in the aforementioned U.S. patent permits the opposite edge portions of horizontally moving sheet material to be simultaneously trimmed.

As best shown in FIGURE 2, frame assembly 10 comprises a generally U-shaped frame 16 which is positioned with its legs extending vertically and mounted in a main base 18. Base 18 includes slideway forming means 20 and 22 which permit frame assembly 10 to be moved longitudinally of the base in a direction parallel to the axes of the cutting blades 12 and 14, so that the location of the plane of cut, and consequently, the width of the sheet trimmed can be varied.

The means provided for selectively moving frame assembly 10 longitudinally of base 18 comprises a horizontally extending lead screw 24 which passes through a nut member 26 which is nonrotatably carried from a framework 27 extending down from the bottom of frame 16. The particular means utilized to rotate lead screw 24 are not important to the present invention and could, for example, comprise a reversible electric motor and gear reducer unit positioned behind the machine. The upper end of the vertically extending legs of frame 16 are connected by a transversely extending cross brace 28 which is bolted or otherwise connected to frame 16.

Positioned within frame 16 and mounted for oscillation relative thereto is a second generally rectangular frame 30. Frame 30 is permitted to have oscillatory movement relative to frame 16 by being mounted in bearings or slideway forming assemblies 32 and 34. The precise manner of construction of these assemblies is not important, however, as shown in FIGURE 7, each of the assemblies 32 comprises a first member 32a carried by frame 30 and defining a bearing surface 32a', and a second member 32b carried by frame 16 and defining a bearing surface 32b'. Although not shown in detail, it is to be understood that assemblies 34 are formed in substantially the same manner. It is important to note that members 32a, 32b, 34a and 34b are formed so that the cooperating slide surfaces 32a', 32b' and 34a' and 34b' are segments of cylinders which have common center lines extending generally parallel to, and/or coextensive with, the axis of rotation of lower arbor 15. This permits the entire frame 30 to be rotated about the axis of the lower blade so that the upper blade can be positioned on the entry or delivery side of the lower blade without shifting the lower blade's position.

The means provided for selectively oscillating frame 16 comprise a transversely extending shaft 42 which is carried in bearings or pillow blocks 44 connected to the top of the upwardly extending legs of frame 16. As best shown in FIGURE 3, the central section 46 of shaft 42 is threaded and passes through a nut assembly 48 carried by a downwardly extending frame portion 49 which is connected to the top of frame 30. As shown in FIGURE 6, nut assembly 48 preferably comprises a large brass or bronze nut member 48a which is provided with a pair of outwardly extending shaft portions 48b which are pivotally mounted in two slide members 48c. Slide members 48c are mounted for sliding movement in slideways 48d formed in the support frame 49.

The means for rotating shaft 42 to oscillate frame 30 to the desired position could take a variety of forms; however, according to the preferred embodiment these means comprise a reversible electric motor 50 connected to a gear reducer 52, the output shaft of which is connected through a coupling 54 to the right hand end of shaft 42. Various types of control arrangements could be utilized to regulate the energization of motor 50 and the positioning of frame 30. For example, as shown in FIGURE 3, these means could comprise a cam type limit switch unit 31 driven from the left hand end of shaft 42 through a right angle drive.

Means are provided to permit the spacing between the horizontal center lines of arbors 13 and 15 to be varied in a vertical direction. As best shown in FIGURES 2 and 7, arbors 13 and 15 are mounted in individual upper and lower chocks 60 and 62, respectively. As shown in FIGURE 7, chocks 60 and 62 are provided with slide members 63 which are received in vertically extending slideways 64 carried by frame 30.

Drive means are provided for moving the upper chock 60 toward and away from the lower chock 62 to thereby vary the gap or amount of overlap of blades 12 and 14. Many types of adjusting mechanisms could be used; however, in accordance with the preferred embodiment, the means comprise four vertically extending rods 70 which pass through large bronze nuts 72 non-rotatably carried in the upper and lower chocks 60 and 62. The portions of the rods 74 which pass through the nuts in the upper chocks are oppositely threaded relative to the lower portions 76 which passed through the nuts in the lower chocks. Consequently, rotation of rods 70 causes movement of the upper chock in a direction toward or away from the lower chock depending on the direction of rotation.

The means provided for simultaneously rotating the shafts 70 to vary the position of chock 60 with respect to 62 include four gears 82 mounted for horizontal rotation in housing 80 formed at the top of frame 30. As best shown in FIGURES 4 and 5, the ends of the shafts 70 that are received in the gears 82 are machined to provide a pair of opposed flats 84. Cooperating flats are formed internally of the gears by inserts 86. Consequently, rotation of gears 86 causes rotation of the shafts 70 but permits the shafts to be moved vertically relative to the gears, for reasons subsequently to be discussed. The means for simultaneously rotating gears 82 include a pinion gear 88 positioned centrally of the gears 82 in engagement therewith and driven through the vertically extending output shaft 89 of a right angle gear reducer 90 that is driven from a reversible electric motor 92.

Because, as previously mentioned, shafts 70 are free to slide vertically in gears 82 means must be provided to support the chocks and the shafts 70. As shown in FIGURE 2, these means comprise a jack 96 which is positioned between the bottom of the lower chock 62 and the bottom of frame 30. Jack 96 also provides means whereby it is possible to vary the elevation of the center lines of arbors 13 and 15 without affecting the spacing therebetween. Note that by driving jack 96 both chocks are simultaneously moved to the desired elevation.

The use of the threaded shafts 70 between chocks 60, 62 is advantageous since it permits ready variation of blade spacing and overlap. However, because of the slight amount of play which is usually present in threaded connections, it is to be expected that as the metal to be sheared enters between blades 12 and 14 the tremendous reaction forces acting on the blades would cause some shifting of the chocks. In order to overcome this problem, the present invention provides means which take up the play between the threads of the nuts and the shafts prior to start of cutting. Although these means could take a variety of forms, according to the preferred embodiment, they comprise hydraulically actuated pistons 100 carried in lower chock 62 and acting upwardly against upper chock 60. As shown in FIGURE 7, the pistons are positioned so that their lines of action are generally between the front shafts 70 and the cutting blades. Consequently, actuation of the pistons produces forces on the chocks which are generally similar in effect to the reaction forces produced during the cutting operation. In this manner the chocks can be preloaded to take up any thread play present and prevent undesired shifting of the chocks during cutting.

As is apparent from the preceding description, the present invention provides a rotary type cutting machine which can be readily adjusted with regard to blade spacing or overlap, as well as work entry angle. This permits the machine to be used on a variety of differing materials without deviating from the ideal setting for each type and thickness.

Obviously modifications and alterations of the preferred embodiment will occur to others upon a reading and understanding of the specification and it is my intention to include all such modifications and alterations as part of my invention insofar as they come within the scope of the appended claims.

Having thus described my invention, I claim:

1. In a cutting machine having a first frame carrying a pair of upper and lower cooperating cutting discs mounted for rotation about spaced horizontal axes, the improvement comprising second frame means for mounting said first frame for oscillation about a line generally coextensive with one of said axes.

2. The improvement as defined in claim 1 further including means for varying the spacing between said horizontal axes.

3. The improvement as defined in claim 1 including selectively operable drive means for oscillating said second frame means.

4. The improvement as defined in claim 1 wherein said second frame means is mounted for movement in a direction parallel to said axes.

5. The improvement as defined in claim 1 wherein said second frame means includes guideways in which said first frame is adapted to oscillate.

6. In a cutting machine having a first frame carrying a pair of upper and lower cooperating cutting discs mounted for rotation on spaced upper and lower horizontal arbors, the improvement comprising: first means for varying the spacing between said horizontal arbors and second means for oscillating said horizontal arbors about a line parallel thereto.

7. The improvement as defined in claim 6 wherein said first means includes a first chock carrying said upper arbor, a second chock carrying said lower arbor, and drive means interconnecting said first and said second chocks.

8. The improvement as defined in claim 6 wherein said second means includes a second frame in which said first frame is mounted.

9. The improvement as defined in claim 6 including third means for simultaneously varying the horizontal elevations of each of said arbors.

10. The improvement as defined in claim 7 wherein said drive means interconnecting said first and second chocks includes a threaded shaft extending through nut members carried in said chocks.

11. The improvement as defined in claim 10 wherein said drive means further includes power means for rotating said shaft.

12. The improvement as defined in claim 10 wherein said chocks are mounted for sliding movement in said first frame.

13. A cutting machine comprising a first generally U-shaped frame positioned with its leg portions extending vertically, a second frame mounted for oscillatory movement in said first frame, first and second chocks carried by said second frame, horizontally extending arbors carried by said chocks, means carried by said second frame for varying the spacing between said chocks, and drive means carried by said first frame for oscillating said second frame.

14. The cutting machine as defined in claim 13 wherein said drive means includes a threaded shaft extending transversely of said first frame and engaging a nut member carried by said second frame.

15. The cutting machine as defined in claim 13 wherein the means for varying the spacing between said chocks includes a threaded shaft extending through nut members carried in said chocks.

16. The cutting machine as defined in claim 15 including means intermediate said chocks for applying an outwardly directed force to said chocks.

17. In a cutting machine having a frame carrying a pair of upper and lower cooperating cutting discs mounted for rotation on spaced upper and lower horizontal axes, the improvement comprising: first means for oscillating at least one of said axes about a line generally parallel thereto while maintaining the spacing between said axes constant, and second means operable independently of said first means for varying the spacing between said axes.

18. A rotary cutting machine comprising: a first frame, a pair of vertically spaced chocks mounted for vertical movement in said frame, means including a threaded shaft for adjusting the spacing between said chocks, horizontally extending rotatable arbors mounted in each of said chocks and each provided with a cutting disc, a second frame in which said first frame is mounted for oscillation about a line generally coextensive with said lower arbor, and means for oscillating said first frame.

19. The cutting machine as defined in claim 18 including means for simultaneously moving both of said chocks vertically.

20. The cutting machine as defined in claim 18 including means positioned subjacent said chocks for simultaneously moving both of said chocks vertically.

21. In a cutting machine having a first frame carrying a pair of upper and lower cooperating cutting discs mounted in separate chocks for rotation about spaced horizontal axes, the improvement comprising: second frame means for mounting said first frame for oscillation about a line generally coextensive with one of said axes; and, means for simultaneously shifting both said chocks in the same direction in said first frame.

22. In a cutting machine having a first frame carrying a pair of upper and lower cooperating cutting discs mounted for rotation about spaced horizontal axes, the improvement comprising second frame means for mounting said first frame for oscillation about a line generally coextensive with one of said axes; and, means for varying the spacing between said cutting discs irrespective of the position of said first frame.

References Cited

UNITED STATES PATENTS 2,548,459   4/1951   Wood _____ 83—503 X

JAMES M. MEISTER, Primary Examiner